Jan. 15, 1952 W. R. CHAMPION 2,582,746
COUPLING FOR PIPES AND TUBES
Filed Feb. 21, 1946 3 Sheets-Sheet 1

Inventor
William Robert Champion
per A. Bowden
Attorney

Jan. 15, 1952     W. R. CHAMPION     2,582,746
COUPLING FOR PIPES AND TUBES
Filed Feb. 21, 1946     3 Sheets-Sheet 2

Inventor
William Robert Champion
per V. V. Bowden
Attorney.

Jan. 15, 1952   W. R. CHAMPION   2,582,746
COUPLING FOR PIPES AND TUBES
Filed Feb. 21, 1946   3 Sheets-Sheet 3

Inventor.
William Robert Champion
per N. R. Bowden
Attorney.

Patented Jan. 15, 1952

2,582,746

UNITED STATES PATENT OFFICE 2,582,746

COUPLING FOR PIPES AND TUBES

William Robert Champion, Croxley Green, England; Mary Ann Champion and Jack K. Carpenter administrators of said William Robert Champion, deceased Application February 21, 1946, Serial No. 649,202
In Great Britain April 30, 1945

5 Claims. (Cl. 285—193)

This invention relates to couplings for ductile metal pipes of that kind in which the end or ends of the pipes to be connected are swaged to form a spigot terminating in an external annular collar and has for its object to improve the construction and design of such couplings so that the latter are adapted to compensate for the unavoidable variations in the thickness and irregularities of surface, such as die marks, which are incidental to the production of ductile pipes and also variations incidental to the swaged formations in order to facilitate the production of efficient fluidtight pipe coupling joints of great mechanical strength and which are capable of resisting higher internal pressures than has hitherto been practicable in pipe couplings of the kind referred to.

In pipe couplings of the kind referred to, as heretofore proposed, the externally swaged collars on the adjacent ends of the pipes to be coupled are clamped between the end faces of an abutment member and a threaded or otherwise adjustable compression member or members of relatively hard metals.

According to this invention pipe couplings of the kind referred to are designed so that each of the swaged spigot ends of the pipes to be coupled makes a forced fit in the socket end of the corresponding abutment of the coupling, so that the inner edge of the abutment penetrates the engaging surface of the spigot to form a counterpart seating thereon and compensate for variations in shape and surface of the spigot, thus making an efficient fluidtight joint capable of withstanding considerable internal pressure.

For this purpose the outwardly swaged collar in which the spigot terminates is developed so that the junction of such swaged collar, with the adjacent surfaces of the pipe, are slightly raised above the original surface thereof, whereby a slight outward taper is imparted to the spigot end adjacent to the vent thereof.

The swaging of the pipe ends can be readily effected by means of a swaging tool, which, for example, comprises a coned mandrel furnished with a screwed collar, a parallel supporting surface and a coned surface and which is adjustably mounted in a cylindrical internally threaded sleeve that comprises a reduced perforated extension, through which a corresponding series of movable elements such as steel balls or pins can be partially extruded by the coned section of the mandrel when the latter is assembled and screwed into the bore of the sleeve.

As the mandrel is withdrawn into the sleeve, the coned section thereof registers with the lateral perforations therein so that the steel balls or other movable elements are supported by the coned section of the mandrel with their outer surfaces substantially flush with the adjacent perforated surface of the reduced extension of the sleeve so that such section of the sleeve may then be inserted into the end of the pipe to be swaged.

The pipe and likewise the swaging tool are held while the mandrel is then screwed into the sleeve so as to gradually extrude the steel balls through the perforations thereof until they contact the interior of the pipe, the resulting pressure thereafter imparting a rotary motion to the sleeve as the mandrel is rotated, until the movable balls are extruded to their maximum.

On completion of the swaging operation the sleeve of the swaging tool is held and the mandrel is retracted, so enabling the balls to be returned into the perforated sleeve as the swaging tool is withdrawn from the swaged spigot end of the pipe.

Couplings in accordance with this invention may be constructed in various manners and are readily applicable to various patterns of pipe couplings and pipe fittings. Thus, the coupling sleeve or support may also be utilized as the abutment member, or such sleeve or support may be furnished with a removable abutment member, while the compression members may be either internally or externally screw threaded so as to co-operate with counterpart threads on the coupling sleeve or support to which they are applied.

The invention is further described with reference to the accompanying drawings wherein similar references indicate corresponding parts.

Figure 3:
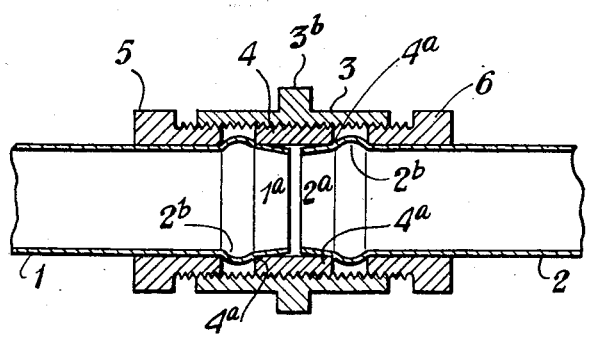

Fig. 3 is a similar view illustrating a further modification in which the ends of the coupling sleeve or support are internally screw threaded to co-operate with externally threaded compression members slidably mounted on the ends of the pipes to be coupled, while the bore of the sleeve is also screw threaded and furnished with a removable externally threaded liner adapted to form the abutment members of the coupling.

Figure 4:
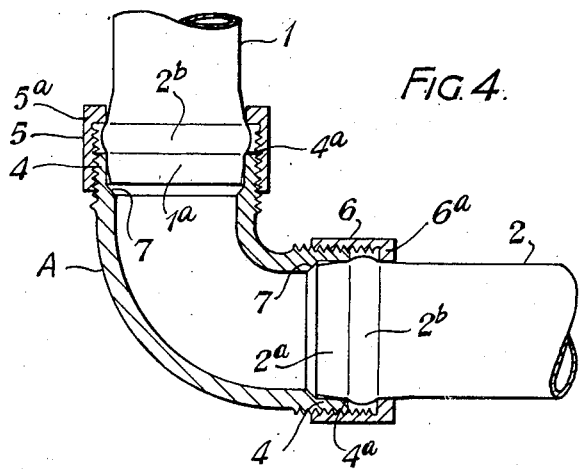
Figure 5:
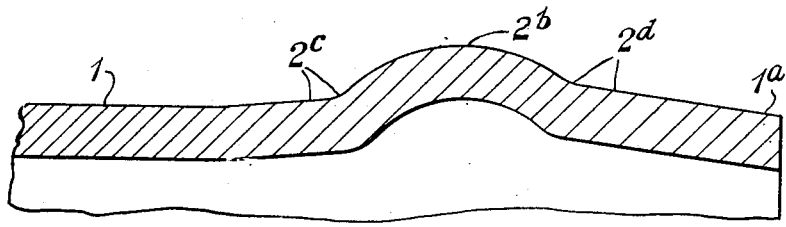
Figure 6:
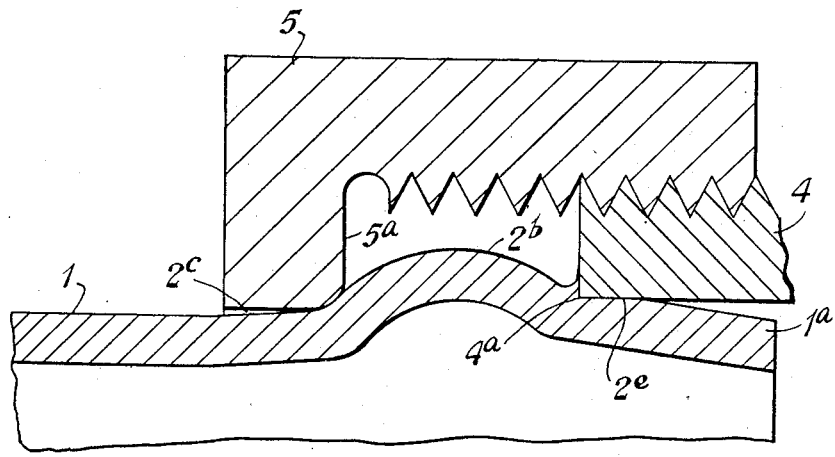

Fig. 4 is an external view partly in section illustrating one application of the coupling according to the present invention, to a bend or elbow. Figs. 5 and 6 are respectively fragmental longitudnial diagrammatic sectional views on an exaggerated scale further illustrating the construction of pipe couplings in accordance with the present invention and hereafter more particularly referred to.

Figures 8, 10:
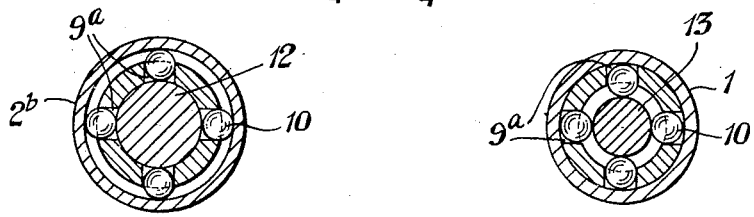
Figure 7:
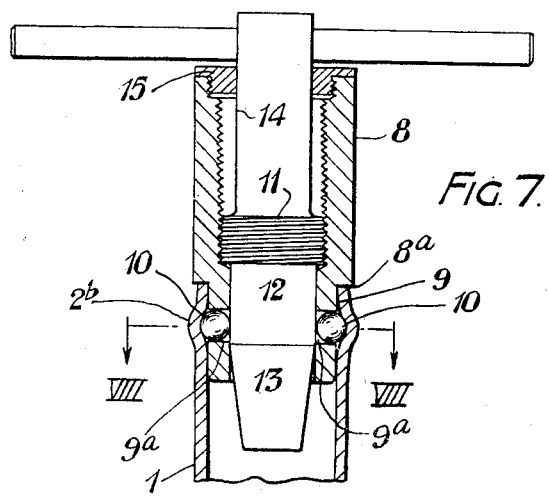

Fig. 7 is a central longitudinal sectional view and Fig. 8 a cross sectional view on the line VIII—VIII, Fig. 7, of a swaging tool adapted for producing the outwardly swaged spigot ends of the pipes to be coupled in accordance with the present invention, the tool being shown in the position which the swaging elements thereof occupy when the swaging operation thereof is completed.

Figure 9:
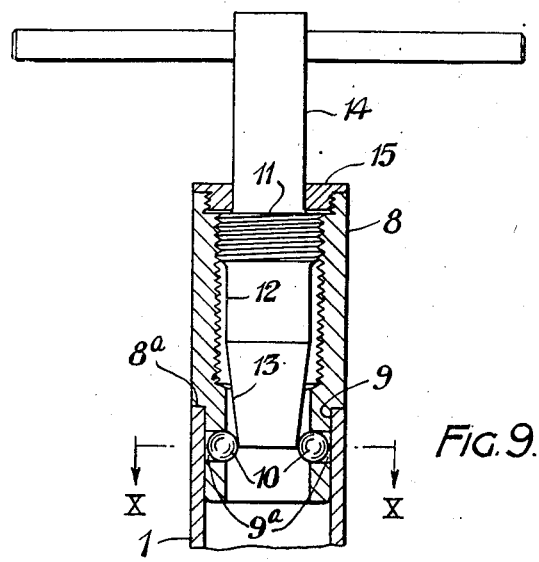

Fig. 9 is a central longitudinal sectional view and Fig. 10 is a cross section on the line X—X, Fig. 9, showing the relative adjustments of the tool before the swaging operation has been commenced.

In the drawings, 1 and 2 indicate the swaged ductile metal pipes to be coupled, 3 the coupling sleeve or support, 4 the relatively hard abutment member or members of the coupling and 5 and 6 the threaded compression members slidably carried on the swaged pipes to be coupled and adapted to co-operate with the coupling sleeve or support and the abutment member or members comprised in or carried thereby.

Figure 1:
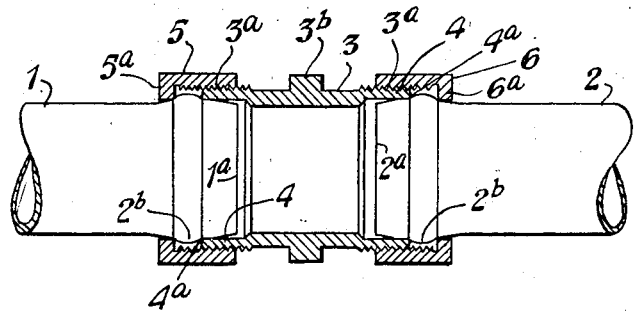
Fig. 1 is a central longitudinal section of a straight through pipe coupling of the kind referred to according to the present invention wherein the ends of the coupling sleeve or support forms the abutments and are externally screw threaded to receive counterpart internally threaded nuts or compression members for securing the ends of the respective pipes fluid tight in the sleeve or support.

In the construction shown in Fig. 1 of the drawings, two copper or other ductile metal pipes 1 and 2 are coupled to a tubular sleeve or support 3, the opposite end of which form two sockets for the reception of the outwardly swaged spigot ends 1a, 2a of such pipes.

Each of the spigot ends terminates in an outwardly swaged convex collar 2b which is developed so that the junctions 2c, 2d thereof, with the adjacent parts of the pipe, have a slight outward displacement and impart a slight outward taper to the spigot from its vent or opening towards the swaged convex collar 2b in which the inner end of the spigot terminates, as indicated diagrammatically in Fig. 5 of the drawings, while the vent or open end of the spigot retains its original diameter and is adapted to make a close fit in the corresponding socket end of the coupling sleeve 3.

The socket ends of the tubular sleeve or support are adapted to form the abutments of the coupling and are each provided with a substantially square edge 4a which engages and penetrates the surface of the corresponding outwardly tapered spigot as the same is forced into engagement with the coupling sleeve by the compression members 5 and 6.

Such compression members are in the form of internally threaded nuts which are reduced at one end 5a and 6a, to make a sliding fit on the pipes 1 and 2 on which they are respectively mounted before the latter are outwardly swaged. After the spigot end of one of the pipes has been assembled in one end of the coupling sleeve, the corresponding compression member can be brought into engagement with the counterpart external thread 3a formed on each end of such sleeve, which is also provided with an external hexagonal or other collar 3b for engagement with a spanner or like holding device, so that the reduced end of the compression member engages the swaged external collar 2b of the pipe.

After the spigot ends of the pipes 1 and 2 have been assembled in the corresponding socket ends of the coupling sleeve or support 3, and the compression members 5 and 6 engaged with the respective external screw threads on the adjacent ends of the coupling sleeve, each compression member may be screwed up, while the coupling sleeve is firmly held by means of a spanner or otherwise, to force the spigot end of each of the pipes 1 and 2 into the socket ends of the coupling sleeve, forming the abutments 4, so that the edge 4a of each abutment penetrates the engaged outwardly tapered surface of the corresponding spigot end to form a counterpart seating 2e as indicated in the diagrammatic view Fig. 6, thus making a mechanically strong fluidtight joint which is adapted to carry considerable internal pressures.

Figure 2:
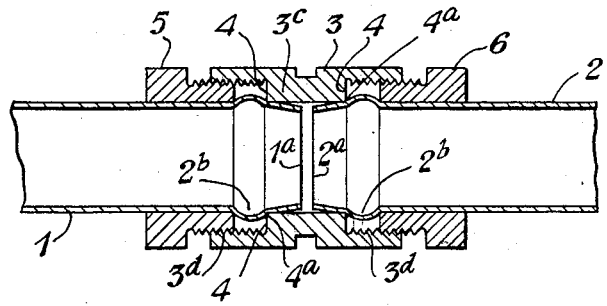
Fig. 2 is a similar view to Fig. 1 in which the bore of the coupling sleeve or support is formed with an integral abutment member and is internally screw threaded to co-operate with externally threaded compression members mounted on the ends of the pipes to be coupled.

In the modification illustrated in Fig. 2, the bore of the coupling sleeve is formed with an internal collar 3c, the opposite ends of which form the abutments 4 for engaging the inclined spigot ends 1a and 2a of the pipes 1 and 2, which latter are secured in the coupling sleeve or support by externally threaded compression members 5 and 6 that are adapted to engage threads 3d formed in each end of the bore of the coupling sleeve or support 3.

As in the last described construction, the compression members 5 and 6 are adapted to make a sliding fit on their respective pipes 1 and 2, to which they are assembled before the ends thereof are swaged up, while such compression members are adapted to engage a spanner or other tool by means of which they can be readily screwed into the coupling sleeve or support 3, while the latter is held as previously described.

Fig. 3 illustrates a construction in which the bore of the coupling sleeve 3 is screw threaded and is adapted to carry an externally threaded removable abutment member 4 and externally threaded compression members 5 and 6 which are respectively mounted upon the pipes 1 and 2 so that they can be brought into engagement with the adjacent end of the threaded bore of the sleeve or support 3 and the externally swaged collar 2b of the corresponding pipe ends and then screwed up.

The compression members 5 and 6 are then screwed up, while the sleeve 3 is firmly held by a spanner or otherwise so as to force the tapered spigot end of the corresponding pipe past the edge 4a of the abutment which forms a counterpart fluidtight seating in the surface of the outwardly tapered spigot end of the corresponding pipe 1 or 2, as above described.

The improved coupling means can be readily adapted for connecting the swaged ends of pipes to various pipe fittings such as elbows, T-pieces, junction boxes and so forth as illustrated for example in Fig. 4, which shows one application of the invention for coupling a pipe to a bend or bibcock, valve or other fitting of the kind usually connected to pipes.

As shown, the bend A is externally screw threaded to receive the compression members 5 and 6 which are each in the form of an internally threaded nut reduced at its outer end 5a or 6a and adapted in any preferred manner to be screwed upon the bend by a spanner or other preferred tool to force the outwardly tapered spigot 1a or 2a of the pipe 1 or 2 past the edge 4a of the abutment 4 formed by the recess 7 in the end of the bore of the bend, so that such edge enters the surface of the outwardly tapered spigot end of the corresponding pipe and forms a counterpart fluidtight seating therewith as described with reference to Figs. 1 and 6 of the drawings.

The swaging, in accordance with the present invention, of the pipes to be coupled, can be readily effected by means of the swaging tool illustrated for example in Figs. 7 to 10 of the drawings, or such swaging may be effected by any other preferred means.

The construction of swaging tool illustrated comprises a cylindrical internally threaded sleeve 8 that terminates at one end in a reduced perforated cylindrical extension 9 which is dimensioned so as to make a sliding fit in the end of the pipe to be swaged, and provided with equally spaced radially disposed perforations 9a through which corresponding steel balls 10 can be partly extruded by means of an adjustable mandrel mounted in the bore of the reduced extension of the sleeve.

The mandrel comprises an externally threaded collar 11 that forms the terminal of one end of a parallel mandrel section 12 which makes a sliding fit in the bore of the reduced perforated cylindrical extension 9 of the sleeve and terminates in a coned terminal section 13, while the opposite side of the threaded collar 11 is provided with a cylindrical extension 14 which works through a removable centrally perforated guide 15 secured in the open end of the internally threaded sleeve 8, the projecting end 14 of the mandrel being furnished with a lever or handle by means of which the tool is operated.

The perforations 9a in the reduced external sleeve are slightly tapered so that their outer ends are of smaller diameter than the steel balls 10 housed therein, so that the latter can only be partly extruded through the outer ends of such perforations, while the inner sides of the steel balls contact the parallel section 12 and coned section 13 of the mandrel as the latter is screwed into and out of the internally threaded sleeve 8.

When the mandrel is screwed out of the sleeve 8, its parallel section 12 is withdrawn from the bore of the reduced extension 9 of the sleeve as shown in Fig. 9, so that the coned section 13 of the mandrel is brought into register with the perforations 9a in which the steel balls 10 are carried, to enable the same to be returned into the bore of the reduced section of the sleeve sufficiently to lie flush with the exterior surface thereof, while the shoulder 8a at the junction of the internally threaded sleeve 8, with its reduced cylindrical extension 9, forms a stop which abuts the terminal end of the pipe to be swaged and thus determines the length of the spigot end thereof formed by the swaging operation as indicated in Figs. 7 and 9.

For use, the mandrel is screwed out of the sleeve until one end of its externally screwed collar 11 abuts the inner surface of the guide 15 secured in the outer end of the sleeve 8 so that the steel balls 10 bear against the small end of the coned terminal section 13 of the mandrel and lie flush with the external surface of the reduced cylindrical extension of the sleeve as shown in Figs. 9 and 10, so that the reduced extension 9 of the sleeve can be introduced into the end of the pipe to be swaged.

The pipe is held while the mandrel is rotated in the appropriate direction in the sleeve 8 in which it is mounted, to return the coned section 13 of the mandrel in the bore of the reduced section of the sleeve, so that such coned section gradually extrudes the steel balls through the perforations 9a of the extension and forces the same against the inner surface of the pipe end to be swaged.

The consequent pressure transmitted through the steel balls locks the sleeve 8 and its extension to the mandrel, so that the sleeve is intermittently rotated with the mandrel until the cylindrical section 12 thereof, in which the larger end of its coned section 13 terminates, engages and holds the steel balls 10 in the fully extruded position, while further travel of the mandrel is prevented by the abutment of its threaded collar 11 with the inner end of the threaded sleeve 8, as shown in Fig. 7 of the drawings.

The mandrel is then withdrawn from the sleeve until the adjacent face of its threaded collar abuts the inner face of the perforated guide 15 secured in the open end of the internally threaded sleeve 8, so that the extruded steel balls can be readily returned into the perforations 9a of the reduced extension 9 of the sleeve and lie flush with the outer surface thereof as the sleeve is withdrawn from the swaged pipe end.

In the construction illlustrated, the reduced extension 9 of the sleeve is provided with four perforations to accommodate a corresponding number of steel balls 10, but the tool may be provided with any convenient number of such movable units acccording to requirements, while the dimensions of the swaging tool are varied according to the character and diameter of the pipes for which it is adapted to be used.

In the construction illustrated, the reduced extension 9 of the sleeve is provided with four perforations to accommodate a corresponding number of steels balls 10, but the tool may be provided with any convenient number of such movable units according to requirements, while the dimensions of the swaging tool are varied according to the character and diameter of the pipes for which it is adapted to be used.

I claim:

1. Coupling means for ductile metal pipes provided with an outwardly swaged collar near the end of each pipe and a tapering end portion immediately adjacent said collar, the taper being directed toward the pipe end, said coupling means comprising a tubular coupling support provided with substantially cylindrical sockets, each freely receiving a tapered end portion as a forced fit, and with relatively hard circumferential abutment corners, each to engage an end portion adjacent the face of the respective collar on the side of the pipe end, and compression members, each being slidably and rotatably mounted on a pipe and threadedly engaged with the coupling support to abut against the opposite face of the collar and to press one of said corners against the engaging end portion surface to make the corner penetrate into said surface in the region where the tapered end portion merges into the collar to form a counterpart seating for said corner and thus a fluidtight line contact seal.

2. Coupling means for ductile metal pipes provided with an outwardly swaged collar near the end of each pipe and a tapering end portion immediately adjacent said collar, the taper being directed toward the pipe end, said coupling means comprising a tubular coupling sleeve shaped to provide a cylindrical socket at each of its ends to freely receive one of said end portions as a forced fit, and to form two circumferential abutment corners, said corners being of relatively hard metal, each to engage an end portion adjacent the face of the respective collar on the side of the pipe end, and compression members, each being slidably and rotatably mounted on a pipe and threadedly engaged with the coupling sleeve to abut against the opposite face of the collar and to press one of said corners against the engaging end portion surface to make the corner penetrate into said surface in the region where the tapered end portion merges into the collar to form a counterpart seating for said corner and thus a fluidtight line contact seal.

3. Means for coupling two ductile metal pipes provided with an outwardly swaged collar near the end of each pipe and a tapering end portion immediately adjacent the said collar, the taper being directed toward the pipe end, said means comprising a tubular coupling sleeve shaped to provide a cylindrical socket at each of its ends to freely receive one of the tapered end portions as a forced fit, and to form circumferential abutment corners, said corners being of relatively hard metal, each to engage an end portion adjacent the face on the side of the pipe end of the respective collar, said coupling sleeve having two external threads, and two compression members, each being slidably and rotatably mounted on a pipe and internally threaded for engagement with one of said external threads to abut against the other face of a collar and to press one of said corners against the engaging end portion surface to make the corner penetrate into said surface in the region where the tapered end portion merges into the collar to form a counterpart seating for said corner and thus a fluidtight line contact seal.

4. Means for coupling two ductile metal pipes provided with an outwardly swaged collar near the end of each pipe and a tapering end portion immediately adjacent said collar, the taper being directed toward the pipe end, said means comprising a tubular coupling sleeve shaped to provide two cylindrical sockets, each to freely receive one of said tapered end portions as a forced fit, and to form two circumferential abutment corners inwardly of the end faces of the coupling sleeve, said corners being of relatively hard metal, each corner to engage an end portion adjacent the face on the side of the pipe end of the respective collar, said coupling sleeve having two internal threads, and two compression members, each being slidably and rotatably mounted on a pipe and externally threaded for engagement with one of said internal threads to abut against the other face of a collar and to press one of said corners against the engaging end portion surface to make the corner penetrate into said surface in the region where the tapered end portion merges into the collar to form a counterpart seating for said corner and thus a fluidtight line contact seal.

5. Means for coupling two ductile metal pipes provided with an outwardly swaged collar near the end of each pipe and a tapering end portion immediately adjacent said collar, the taper being directed toward the pipe end, said means comprising a tubular coupling support including a sleeve and a liner, said sleeve and liner forming two cylindrical sockets to freely receive the tapered end portions as a forced fit, the liner forming two circumferential abutment corners, said corners being of relatively hard metal, each to engage an end portion adjacent the face on the side of the pipe end of the respective collar, the liner being externally threaded, said sleeve being matingly internally threaded for cooperation with the thread of the liner, and two compression members, each being slidably and rotatably mounted on a pipe and externally threaded for engagement with the thread of the sleeve to abut against the other face of a collar and to press one of said corners against the engaging end portion surface to make the corner penetrate into said surface in the region where the tapered end portion merges into the collar to form a counterpart seating for said corner and thus a fluidtight line contact seal.

WILLIAM ROBERT CHAMPION.

REFERENCES CITED

The following references are of record in the file of this patent:

UNITED STATES PATENTS

| Number | Name | Date |
|---|---|---|
| 598,857 | Coffee | Feb. 8, 1898 |
| 906,099 | Burgess | Dec. 8, 1908 |
| 1,063,996 | Moore | June 10, 1913 |
| 1,817,854 | Sorensen | Aug. 4, 1931 |
| 1,858,136 | Brenner | May 10, 1932 |
| 1,961,453 | Quarnstrom | June 5, 1934 |
| 2,250,477 | Fleischman | July 29, 1941 |
| 2,269,629 | Kreidel | Jan. 13, 1942 |
| 2,366,010 | Dies | Dec. 26, 1944 |

FOREIGN PATENTS

| Number | Country | Date |
|---|---|---|
| 272,071 | Great Britain | June 9, 1927 |
| 393,419 | Great Britain | June 8, 1933 |